(12) United States Patent
Wu

(10) Patent No.: US 10,156,765 B2
(45) Date of Patent: *Dec. 18, 2018

(54) ELECTROPHORETIC DISPLAY APPARATUS

(71) Applicant: E Ink Holdings Inc., Hsinchu (TW)

(72) Inventor: Chi-Ming Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 336 days.

This patent is subject to a terminal disclaimer.

(21) Appl. No.: 15/001,242

(22) Filed: Jan. 20, 2016

(65) Prior Publication Data

US 2016/0139480 A1    May 19, 2016

Related U.S. Application Data

(63) Continuation-in-part of application No. 14/045,795, filed on Oct. 4, 2013, now Pat. No. 9,268,192.

(30) Foreign Application Priority Data

Jan. 9, 2013    (TW) .............................. 102100740 A

(51) Int. Cl.
*G02F 1/167* (2006.01)
*G02F 1/1345* (2006.01)
*G02F 1/17* (2006.01)

(52) U.S. Cl.
CPC .......... *G02F 1/167* (2013.01); *G02F 1/13452* (2013.01); *G02F 1/172* (2013.01); *G02F 2001/1672* (2013.01); *G02F 2202/28* (2013.01)

(58) Field of Classification Search
CPC ...... G02F 1/167; G02F 1/13452; G02F 1/172; G02F 2001/1672; G02F 2202/28
USPC ......................................................... 359/296
See application file for complete search history.

(56) References Cited

U.S. PATENT DOCUMENTS 8,900,970 B2 * 12/2014 Maruyama ....... G06K 19/07749
                                                      438/458
2010/0177032 A1    7/2010  Yamada
2012/0146975 A1    6/2012  de Zeeuw et al.
2012/0287175 A1   11/2012  Yamada

* cited by examiner

*Primary Examiner* — William R Alexander
*Assistant Examiner* — Grant Gagnon
(74) *Attorney, Agent, or Firm* — JCIPRNET

(57) ABSTRACT

An electrophoretic display apparatus, adapted to be electrically connected with an external circuit, includes a driving array substrate, an electrophoretic display layer, and a first optical adhesive layer. The electrophoretic display layer includes a flexible substrate and a display medium layer. The flexible substrate has a configuration area and a bonding area. The external circuit is disposed between the flexible substrate and the driving array substrate. The external circuit is located in the bonding area and extends outside the driving array substrate. The display medium layer is disposed between the flexible substrate and the driving array substrate and located in the configuration area. The first optical adhesive layer is disposed between the display medium layer and the driving array substrate. A thickness of the external circuit is smaller than a sum of a thickness of the display medium layer and a thickness of the first optical adhesive layer.

20 Claims, 5 Drawing Sheets

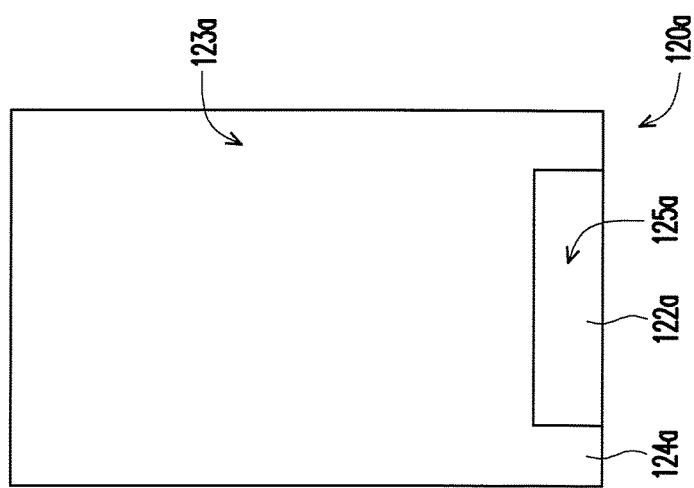

ELECTROPHORETIC DISPLAY APPARATUS

CROSS-REFERENCE TO RELATED APPLICATION

This application is a continuation-in-part application of and claims the priority benefit of a prior application Ser. No. 14/045,795, filed on Oct. 4, 2013, now allowed. The prior application Ser. No. 14/045,795 claims the priority benefit of Taiwan application serial no. 102100740, filed on Jan. 9, 2013. The entirety of each of the above-mentioned patent applications is hereby incorporated by reference herein and made a part of this specification.

BACKGROUND OF THE INVENTION

Field of the Invention

The invention relates to a display apparatus and more particularly relates to an electrophoretic display apparatus.

Description of Related Art

Generally, electronic paper and e-books utilize electrophoretic display technology to achieve the purpose of displaying images. According to the current technology, an electrophoretic display is mainly composed of a front plane laminate (FPL), a transistor array substrate, and a display medium layer between the front plane laminate and the transistor array substrate. When the electrophoretic display is to be electrically connected with other electronic devices via an external circuit, the external circuit will be inserted between a part of the display medium layer and a part of the transistor array substrate. In such a case, however, the inserted external circuit will cause the overall structure of the electrophoretic display to have an uneven surface. That is, where the external circuit is inserted will protrude upward.

SUMMARY OF THE INVENTION

The invention provides an electrophoretic display apparatus that has favorable surface evenness.

The electrophoretic display apparatus of the invention is adapted to be electrically connected with an external circuit. The electrophoretic display apparatus includes a driving array substrate, an electrophoretic display layer, and a first optical adhesive layer. The electrophoretic display layer is disposed on the driving array substrate and includes a flexible substrate and a display medium layer. The flexible substrate has a configuration area and a bonding area, wherein the configuration area surrounds the bonding area. The external circuit is disposed between the flexible substrate and the driving array substrate, and the external circuit is located in the bonding area and extends outside the driving array substrate. The display medium layer is disposed between the flexible substrate and the driving array substrate and located in the configuration area. The first optical adhesive layer is disposed between the display medium layer and the driving array substrate, wherein a thickness of the external circuit is smaller than a sum of a thickness of the display medium layer and a thickness of the first optical adhesive layer.

In an embodiment of the invention, the electrophoretic display apparatus further includes an anisotropic conductive adhesive disposed between the external circuit and the driving array substrate.

In an embodiment of the invention, a gap exists between the display medium layer and the external circuit, and the anisotropic conductive adhesive overflows from the gap and covers the gap.

In an embodiment of the invention, a length of the gap is 0.1 mm to 2.0 mm.

In an embodiment of the invention, the external circuit is a chip on film external circuit.

In an embodiment of the invention, the driving array substrate includes an active array substrate or a passive array substrate.

In an embodiment of the invention, the electrophoretic display apparatus further includes: a first protective layer disposed on the electrophoretic display layer; and a second protective layer disposed on the driving array substrate, wherein the electrophoretic display layer and the driving array substrate are located between the first protective layer and the second protective layer.

In an embodiment of the invention, the electrophoretic display apparatus further includes: a second optical adhesive layer disposed between the electrophoretic display layer and the first protective layer; and a third optical adhesive layer disposed between the driving array substrate and the second protective layer.

In an embodiment of the invention, the display medium layer includes a plurality of display media, and each of the display media includes an electrophoretic liquid and a plurality of charged particles distributed in the electrophoretic liquid.

In an embodiment of the invention, the display medium layer includes a plurality of display media, and each of the display media includes an electrophoretic liquid, a plurality of charged particles distributed in the electrophoretic liquid, and a micro-cup structure. The micro-cup structure is disposed on the flexible substrate and is bonded to the first optical adhesive layer to encapsulate the electrophoretic liquid and the charged particles in the micro-cup structure.

An electrophoretic display apparatus of the invention is adapted to be electrically connected with an external circuit. The electrophoretic display apparatus includes a driving array substrate, an electrophoretic display layer, and a first optical adhesive layer. The external circuit is disposed on the driving array substrate and extends outside the driving array substrate. The electrophoretic display layer is disposed on the driving array substrate and includes a flexible substrate and a display medium layer. The display medium layer is disposed between the flexible substrate and the driving array substrate. The first optical adhesive layer is disposed between the display medium layer and the driving array substrate, wherein a thickness of the external circuit is smaller than or equal to a sum of a thickness of the flexible substrate, a thickness of the display medium layer, and a thickness of the first optical adhesive layer.

In an embodiment of the invention, the electrophoretic display apparatus further includes an anisotropic conductive adhesive disposed between the external circuit and the driving array substrate.

In an embodiment of the invention, a gap exists between the display medium layer and the external circuit, and the anisotropic conductive adhesive overflows from the gap and covers the gap.

In an embodiment of the invention, a length of the gap is 0.1 mm to 2.0 mm.

In an embodiment of the invention, the external circuit is a chip on film external circuit.

In an embodiment of the invention, the driving array substrate includes an active array substrate or a passive array substrate.

In an embodiment of the invention, the electrophoretic display apparatus further includes: a first protective layer disposed on the electrophoretic display layer and the external circuit; and a second protective layer disposed on the driving array substrate, wherein the electrophoretic display layer and the driving array substrate are located between the first protective layer and the second protective layer.

In an embodiment of the invention, the electrophoretic display apparatus further includes: a second optical adhesive layer disposed between the electrophoretic display layer and the first protective layer and between the external circuit and the first protective layer; and a third optical adhesive layer disposed between the driving array substrate and the second protective layer.

In an embodiment of the invention, the display medium layer includes a plurality of display media, and each of the display media includes an electrophoretic liquid and a plurality of charged particles distributed in the electrophoretic liquid.

In an embodiment of the invention, the display medium layer includes a plurality of display media, and each of the display media includes an electrophoretic liquid, a plurality of charged particles distributed in the electrophoretic liquid, and a micro-cup structure. The micro-cup structure is disposed on the flexible substrate and is bonded to the first optical adhesive layer to encapsulate the electrophoretic liquid and the charged particles in the micro-cup structure.

Based on the above, according to the invention, the external circuit is disposed between the flexible substrate of the electrophoretic display layer and the driving array substrate and the thickness of the external circuit is smaller than the sum of the thickness of the display medium layer and the thickness of the first optical adhesive layer; or the external circuit is disposed on the driving array substrate and the thickness of the external circuit is smaller than or equal to the sum of the thickness of the flexible substrate, the thickness of the display medium layer, and the thickness of the first optical adhesive layer. Therefore, where the external circuit is inserted does not protrude upward, and the electrophoretic display apparatus of the invention has favorable surface evenness.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 1B is a bottom view of an electrophoretic display layer of the electrophoretic display apparatus in FIG. 1A.

DESCRIPTION OF THE EMBODIMENTS

Figure 1A:
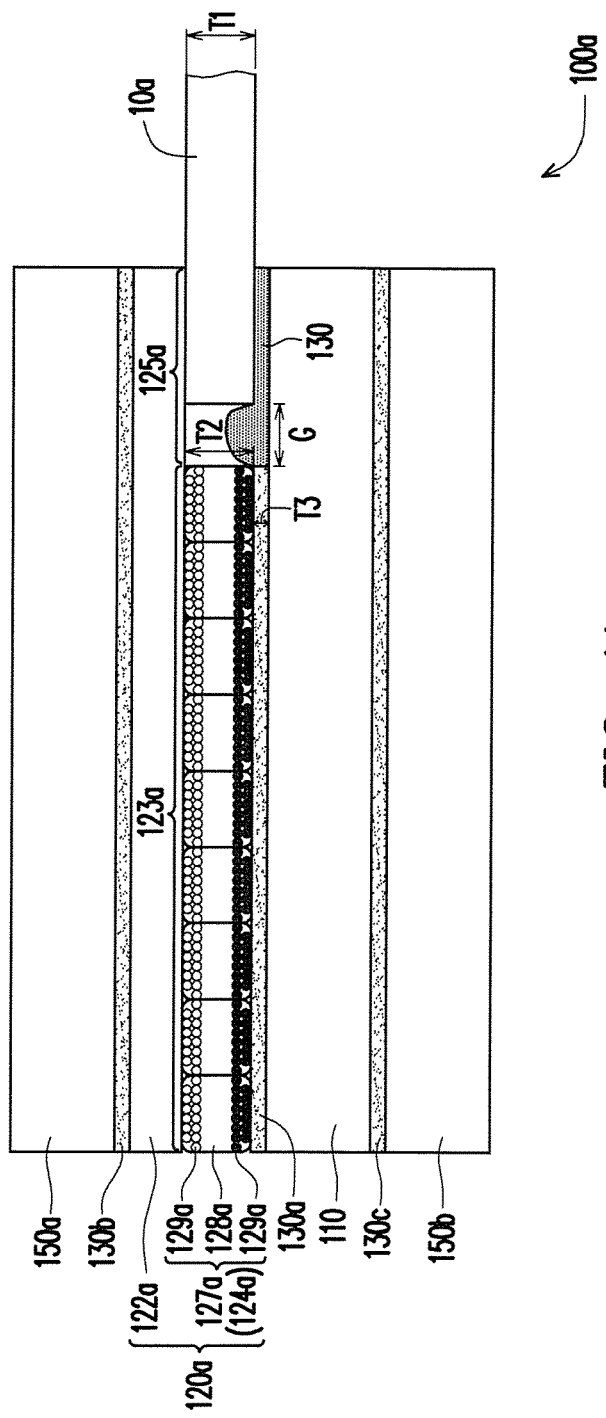
FIG. 1A is a cross-sectional view of an electrophoretic display apparatus according to an embodiment of the invention.

FIG. 1A is a cross-sectional view of an electrophoretic display apparatus according to an embodiment of the invention. FIG. 1B is a bottom view of an electrophoretic display layer of the electrophoretic display apparatus in FIG. 1A. Referring to FIG. 1A and FIG. 1B, in this embodiment, an electrophoretic display apparatus 100a is adapted to be electrically connected with an external circuit 10a. The electrophoretic display apparatus 100a includes a driving array substrate 110, an electrophoretic display layer 120a, and a first optical adhesive layer 130a. The electrophoretic display layer 120a is disposed on the driving array substrate 110 and includes a flexible substrate 122a and a display medium layer 124a. The flexible substrate 122a includes a configuration area 123a and a bonding area 125a, wherein the configuration area 123a surrounds the bonding area 125a. The external circuit 10a is disposed between the flexible substrate 122a and the driving array substrate 110, and the external circuit 10a is located in the bonding area 125a and extends outside the driving array substrate 110. The display medium layer 124a is disposed between the flexible substrate 122a and the driving array substrate 110 and is located in the configuration area 123a. The first optical adhesive layer 130a is disposed between the display medium layer 124a and the driving array substrate 110, wherein a thickness T1 of the external circuit 10a is smaller than a sum of a thickness T2 of the display medium layer 124a and a thickness T3 of the first optical adhesive layer 130a.

Specifically, the driving array substrate 110 of this embodiment is an active array substrate or a passive array substrate, for example, but the invention is not limited thereto. The driving array substrate 110 is provided to drive the display medium layer 124a in the electrophoretic display layer 120a. The display medium layer 124a of this embodiment includes a plurality of display media 127a, wherein each of the display media 127a includes an electrophoretic liquid 128a and a plurality of charged particles 129a distributed in the electrophoretic liquid 128a. In short, the display medium 127a of this embodiment is a micro-capsule structure, for example. Moreover, a material of the flexible substrate 122a of this embodiment is poly-ethylene terephthalate (PET), for example, but the invention is not limited thereto. The external circuit 10a is a chip on film external circuit, for example, but the invention is not limited thereto.

In addition, the electrophoretic display apparatus 100a of this embodiment further includes an anisotropic conductive adhesive 130, which is disposed between the external circuit 10a and the driving array substrate 110. The external circuit 10a is fixed and electrically connected with the driving array substrate 110 through the anisotropic conductive adhesive 130. As shown in FIG. 1A, in this embodiment, the display medium layer 124a and the external circuit 10a has a gap G therebetween, and the anisotropic conductive adhesive 130 overflows from the gap G and covers the gap G, wherein a length of the gap G is 0.1 mm to 2.0 mm. Preferably, the anisotropic conductive adhesive 130 that overflows at least covers 50% or more of the gap G, so as to effectively protect the circuit on the driving array substrate 110. It should be noted that FIG. 1A illustrates an example where the gap G is completely covered. That is, a surface of the driving array substrate 110 is completely covered by the first optical adhesive layer 130a and the anisotropic conductive adhesive 130. Nevertheless, the invention is not limited thereto.

In order to enhance the structural strength, the electrophoretic display apparatus 100a of this embodiment may further include a first protective layer 150a and a second protective layer 150b. The first protective layer 150a is disposed on the electrophoretic display layer 120a. The second protective layer 150b is disposed on the driving array substrate 110, and the electrophoretic display layer 120a and the driving array substrate 110 are located between the first protective layer 150a and the second protective layer 150b. In addition, the electrophoretic display apparatus 100a of this embodiment may further include a second optical adhesive layer 130b and a third optical adhesive layer 130c. The second optical adhesive layer 130b is disposed between the electrophoretic display layer 120a and the first protective layer 150a for fixing the first protective layer 150a onto the electrophoretic display layer 120a. The third optical adhesive layer 130c is disposed between the driving array substrate 110 and the second protective layer 150b for fixing the second protective layer 150b onto the driving array substrate 110.

In this embodiment, the display medium layer 124a is not disposed in the bonding area 125a of the flexible substrate 122a. It means that the display medium layer 124a is disposed only in the configuration area 123a of the flexible substrate 122a. Therefore, when the external circuit 10a is disposed between the bonding area 125a of the flexible substrate 122a and the driving array substrate 110, since the thickness T1 of the external circuit 10a is smaller than the sum of the thickness T2 of the display medium layer 124a and the thickness T3 of the first optical adhesive layer 130a, where the external circuit 10a is inserted does not protrude upward. Hence, the overall electrophoretic display apparatus 100a has favorable surface evenness.

Figure 2:
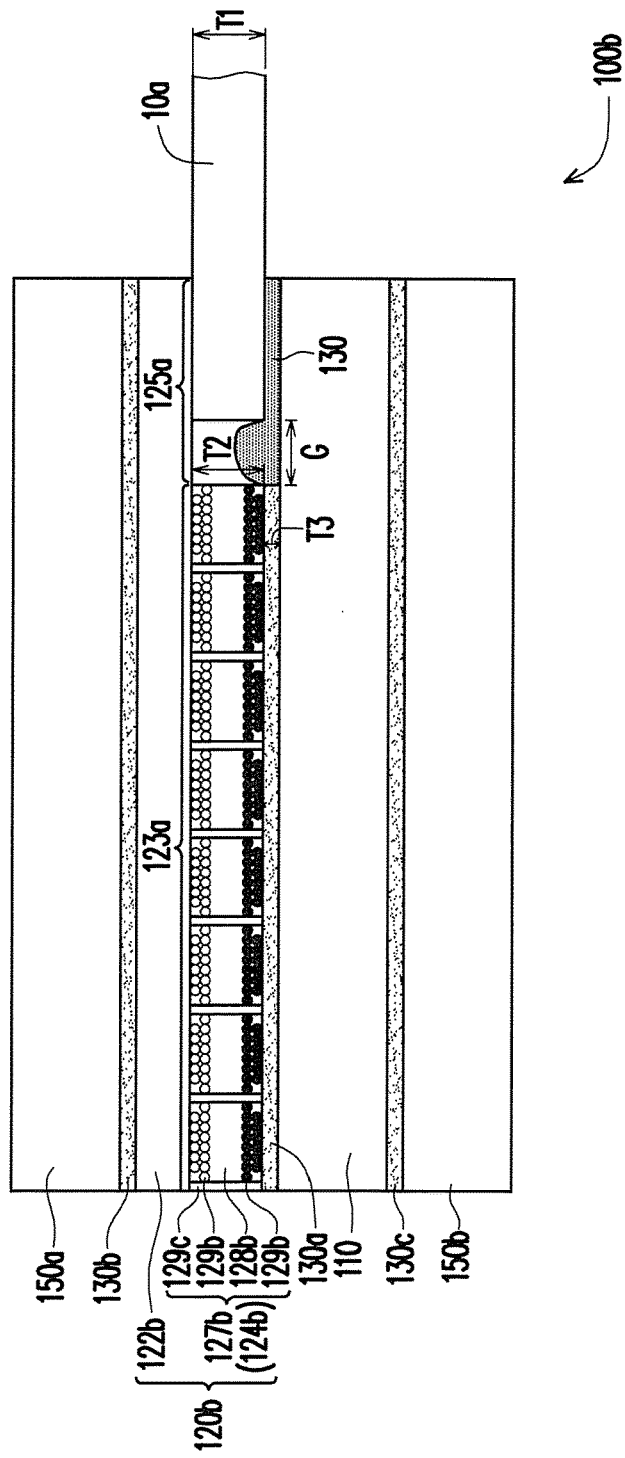
FIG. 2 is a cross-sectional view of an electrophoretic display apparatus according to another embodiment of the invention.

It should be noted that the disclosure is not intended to limit the structure/form of the display medium layer 124a. Although the display medium layer 124a described here is substantially composed of the display media 127a having multiple micro-capsule structures, any known structural design that can achieve equivalent display effects may be adopted by the invention and thus falls within the scope of the invention. For example, referring to FIG. 2, a main difference between an electrophoretic display apparatus 100b of this embodiment and the electrophoretic display apparatus 100a of the previous embodiment is that: a display medium layer 124b of an electrophoretic display layer 120b of this embodiment includes a plurality of display media 127b. Each of the display media 127b includes an electrophoretic liquid 128b, a plurality of charged particles 129b distributed in the electrophoretic liquid 128b, and a micro-cup structure 129c. The micro-cup structure 129c is disposed on a flexible substrate 129b and is bonded to the first optical adhesive layer 130a, so as to encapsulate the electrophoretic liquid 128b and the charged particles 129b in the micro-cup structure 129c. In short, the display medium 127b of this embodiment is a micro-cup structure, for example.

It should be noted that the reference numerals and a part of the content of the previous embodiment are used in the following embodiment, in which identical reference numerals indicate identical or similar components, and repeated description of the same technical content is omitted. Please refer to the description of the previous embodiment for the omitted content, which will not be repeated in the following embodiment.

Figure 3:
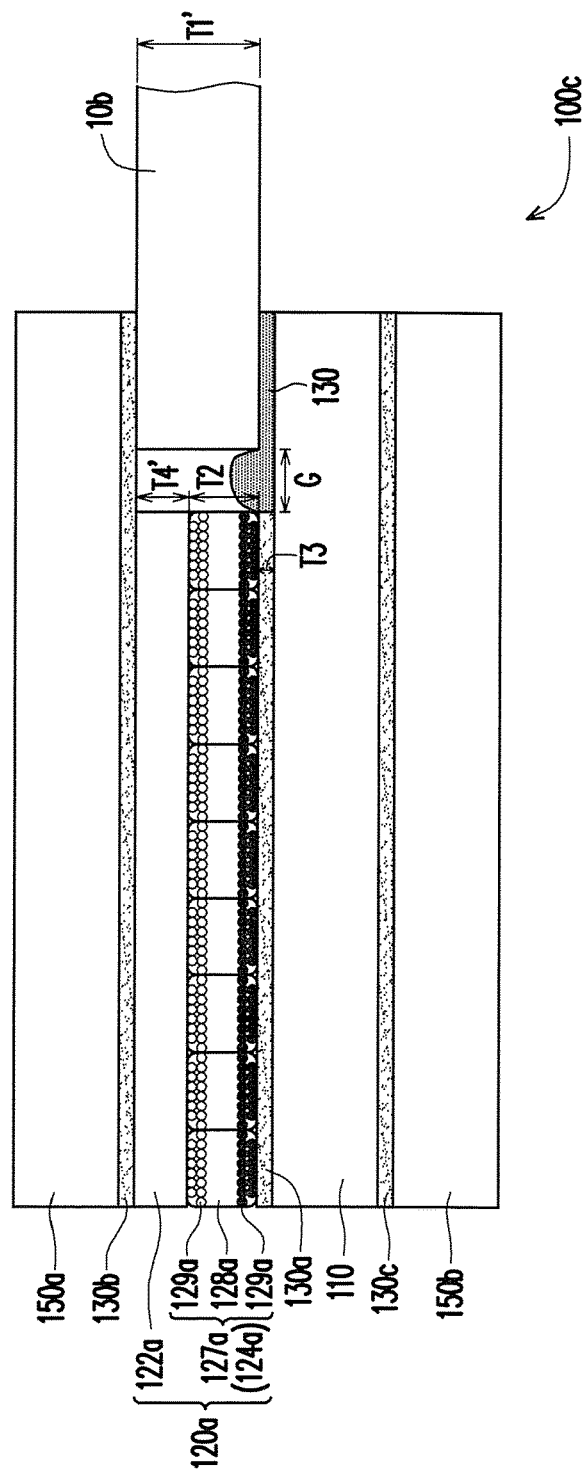
FIG. 3 is a cross-sectional view of an electrophoretic display apparatus according to another embodiment of the invention.

FIG. 3 is a cross-sectional view of an electrophoretic display apparatus according to another embodiment of the invention. Referring to FIG. 1 and FIG. 3, a main difference between an electrophoretic display apparatus 100c of this embodiment and the electrophoretic display apparatus 100a of the previous embodiment is that: an external circuit 10b of this embodiment is disposed on the driving array substrate 110 and extends outside the driving array substrate 110, wherein the flexible substrate 122a of the electrophoretic display layer 120a does not extend above the external circuit 10b. In particular, a thickness T1' of the external circuit 10b of this embodiment is smaller than or equal to a sum of a thickness T4' of the flexible substrate 122a, the thickness T2 of the display medium layer 124a, and the thickness T3 of the first optical adhesive layer 130a. In this embodiment, because the flexible substrate 122a does not extend above the external circuit 10b and the thickness T1' of the external circuit 10b is smaller than or equal to the sum of the thickness T4' of the flexible substrate 122a, the thickness T2 of the display medium layer 124a, and the thickness T3 of the first optical adhesive layer 130a, where the external circuit 10b is inserted does not protrude upward. Hence, the overall electrophoretic display apparatus 100c has favorable surface evenness.

Figure 4:
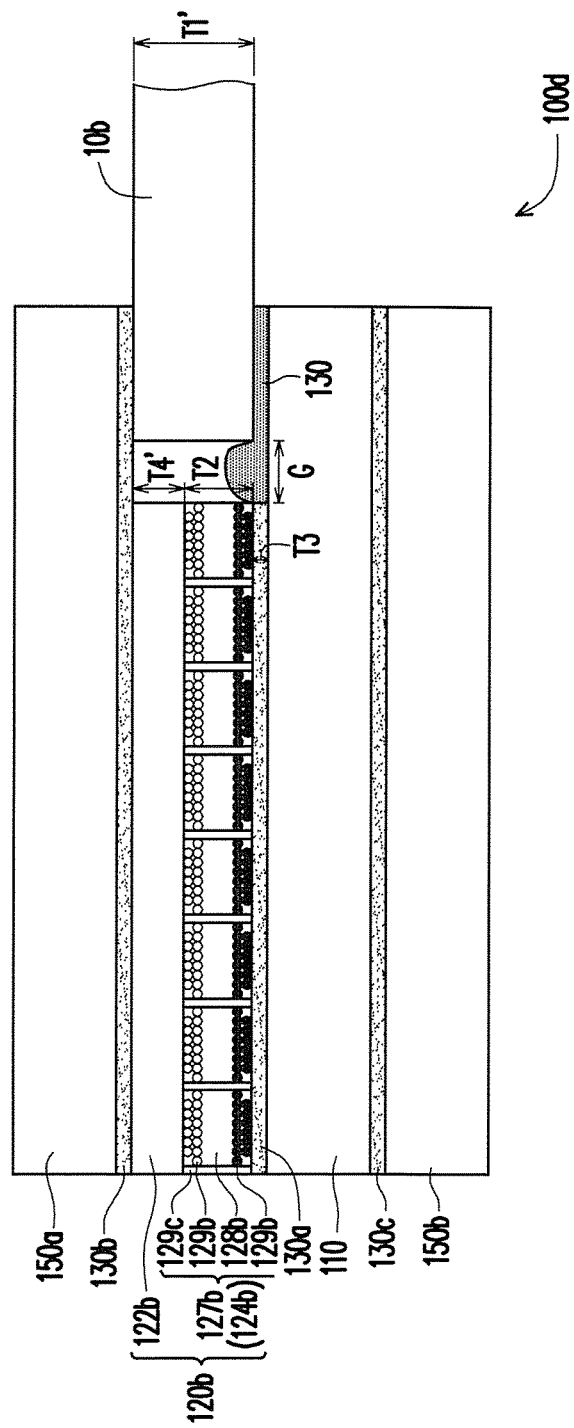
FIG. 4 is a cross-sectional view of an electrophoretic display apparatus according to another embodiment of the invention.

FIG. 4 is a cross-sectional view of an electrophoretic display apparatus according to another embodiment of the invention. Referring to FIG. 3 and FIG. 4, a main difference between an electrophoretic display apparatus 100d of this embodiment and the electrophoretic display apparatus 100c of the previous embodiment is that: the display medium layer 124b of the electrophoretic display layer 120b of this embodiment includes a plurality of display media 127b. Each of the display media 127b includes an electrophoretic liquid 128b, a plurality of charged particles 129b distributed in the electrophoretic liquid 128b, and a micro-cup structure 129c. The micro-cup structure 129c is disposed on the flexible substrate 122b and is bonded to the first optical adhesive layer 130a, so as to encapsulate the electrophoretic liquid 128b and the charged particles 129b in the micro-cup structure 129c. In short, the display medium 127b of this embodiment is a micro-cup structure, for example.

In conclusion, according to the invention, the external circuit is disposed between the flexible substrate of the electrophoretic display layer and the driving array substrate and the thickness of the external circuit is smaller than the sum of the thickness of the display medium layer and the thickness of the first optical adhesive layer; or the external circuit is disposed on the driving array substrate and the thickness of the external circuit is smaller than or equal to the sum of the thickness of the flexible substrate, the thickness of the display medium layer, and the thickness of the first optical adhesive layer. Therefore, where the external circuit is inserted does not protrude upward, and the electrophoretic display apparatus of the invention has favorable surface evenness.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An electrophoretic display apparatus, adapted to be electrically connected with an external circuit, the electrophoretic display apparatus comprising:
    a driving array substrate;
    an electrophoretic display layer disposed on the driving array substrate, wherein the electrophoretic display layer comprises:
        a flexible substrate comprising a configuration area and a bonding area, wherein the bonding area is located at a side of the configuration area and the external circuit is disposed between the flexible substrate and the driving array substrate, and the external circuit is located in the bonding area and extends outside the driving array substrate; and
a display medium layer disposed between the flexible substrate and the driving array substrate and located in the configuration area; and
a first optical adhesive layer disposed between the display medium layer and the driving array substrate, wherein a thickness of the external circuit is smaller than a sum of a thickness of the display medium layer and a thickness of the first optical adhesive layer.

2. The electrophoretic display apparatus as recited in claim 1, wherein the driving array substrate comprises an active array substrate or a passive array substrate.

3. The electrophoretic display apparatus as recited in claim 1, wherein the display medium layer comprises a plurality of display media, and each of the display media comprises an electrophoretic liquid and a plurality of charged particles distributed in the electrophoretic liquid.

4. The electrophoretic display apparatus as recited in claim 1, wherein the display medium layer comprises a plurality of display media, and each of the display media comprises an electrophoretic liquid, a plurality of charged particles distributed in the electrophoretic liquid, and a micro-cup structure, wherein the micro-cup structure is disposed on the flexible substrate and is bonded to the first optical adhesive layer to encapsulate the electrophoretic liquid and the charged particles in the micro-cup structure.

5. The electrophoretic display apparatus as recited in claim 1, further comprising:
a first protective layer disposed on the electrophoretic display layer; and
a second protective layer disposed on the driving array substrate, wherein the electrophoretic display layer and the driving array substrate are located between the first protective layer and the second protective layer.

6. The electrophoretic display apparatus as recited in claim 5, further comprising:
a second optical adhesive layer disposed between the electrophoretic display layer and the first protective layer; and
a third optical adhesive layer disposed between the driving array substrate and the second protective layer.

7. The electrophoretic display apparatus as recited in claim 1, further comprising:
an anisotropic conductive adhesive disposed between the external circuit and the driving array substrate.

8. The electrophoretic display apparatus as recited in claim 7, wherein a gap exists between the display medium layer and the external circuit, and the anisotropic conductive adhesive overflows from the gap and covers the gap.

9. The electrophoretic display apparatus as recited in claim 8, wherein a length of the gap is 0.1 mm to 2.0 mm.

10. The electrophoretic display apparatus as recited in claim 8, wherein the anisotropic conductive adhesive that overflows at least covers 50% or more of the gap.

11. An electrophoretic display apparatus, adapted to be electrically connected with an external circuit, the electrophoretic display apparatus comprising:
a driving array substrate, wherein the external circuit is disposed on the driving array substrate and extends outside the driving array substrate;
an electrophoretic display layer disposed on the driving array substrate, wherein the electrophoretic display layer comprises:
a flexible substrate; and
a display medium layer disposed between the flexible substrate and the driving array substrate; and
a first optical adhesive layer disposed between the display medium layer and the driving array substrate, wherein a thickness of the external circuit is smaller than or equal to a sum of a thickness of the flexible substrate, a thickness of the display medium layer, and a thickness of the first optical adhesive layer.

12. The electrophoretic display apparatus as recited in claim 11, wherein the driving array substrate comprises an active array substrate or a passive array substrate.

13. The electrophoretic display apparatus as recited in claim 11, wherein the display medium layer comprises a plurality of display media, and each of the display media comprises an electrophoretic liquid and a plurality of charged particles distributed in the electrophoretic liquid.

14. The electrophoretic display apparatus as recited in claim 11, wherein the display medium layer comprises a plurality of display media, and each of the display media comprises an electrophoretic liquid, a plurality of charged particles distributed in the electrophoretic liquid, and a micro-cup structure, wherein the micro-cup structure is disposed on the flexible substrate and is bonded to the first optical adhesive layer to encapsulate the electrophoretic liquid and the charged particles in the micro-cup structure.

15. The electrophoretic display apparatus as recited in claim 11, further comprising:
a first protective layer disposed on the electrophoretic display layer and the external circuit; and
a second protective layer disposed on the driving array substrate, wherein the electrophoretic display layer and the driving array substrate are located between the first protective layer and the second protective layer.

16. The electrophoretic display apparatus as recited in claim 15, further comprising:
a second optical adhesive layer disposed between the electrophoretic display layer and the first protective layer and between the external circuit and the first protective layer; and
a third optical adhesive layer disposed between the driving array substrate and the second protective layer.

17. The electrophoretic display apparatus as recited in claim 11, further comprising:
an anisotropic conductive adhesive disposed between the external circuit and the driving array substrate.

18. The electrophoretic display apparatus as recited in claim 17, wherein a gap exists between the display medium layer and the external circuit, and the anisotropic conductive adhesive overflows from the gap and covers the gap.

19. The electrophoretic display apparatus as recited in claim 18, wherein a length of the gap is 0.1 mm to 2.0 mm.

20. The electrophoretic display apparatus as recited in claim 18, wherein the anisotropic conductive adhesive that overflows at least covers 50% or more of the gap.

* * * * *